United States Patent [19]

Swiat

[11] Patent Number: 5,141,607
[45] Date of Patent: Aug. 25, 1992

[54] METHOD AND APPARATUS FOR THE REMOVAL OF CHLORIDES FROM STEEL REINFORCED CONCRETE STRUCTURES

[75] Inventor: Wayne J. Swiat, Homerville, Ohio

[73] Assignee: Corrpro Companies, Inc., Medina, Ohio

[21] Appl. No.: 560,175

[22] Filed: Jul. 31, 1990

[51] Int. Cl.⁵ .............................................. C23F 13/00
[52] U.S. Cl. ..................................... 204/147; 204/196
[58] Field of Search ................. 204/147, 148, 196, 197

[56] References Cited

U.S. PATENT DOCUMENTS 4,832,803 5/1989 Vennesland ........................ 204/130

OTHER PUBLICATIONS

Slater et al., "Electrochemical Removal of Chlorides from Concrete Bridge Decks", Nov. 1976, pp. 21-26.
Lankard et al., "Neutralization of Chloride in Concrete", Federal Highway Administration, Sep. 1975, pp. 46 and 96.

Primary Examiner—John Niebling
Assistant Examiner—Kathryn Gorgos
Attorney, Agent, or Firm—Renner, Otto, Boisselle & Sklar

[57] ABSTRACT

A method and apparatus for the removal of chlorides from steel reinforced concrete utilizes an electrode with a rectifier impressing a voltage between the steel of the concrete and the electrode. The electrode and the surrounding concrete are saturated continuously with a controlled flow of an aqueous electrolyte. The aqueous electrolyte which may be water or salt water increases chloride movement within the concrete away from the steel reinforcing and improves the efficiency of the process by maintaining a saturated pore structure within the concrete. To facilitate such saturation of the concrete and electrode, the electrode may be immersed in a matrix of a porous water absorbing medium contained within a non-metallic membrane or jacket cover. In some forms, a collecting bin or reservoir is provided at the bottom to collect the aqueous solution for recirculation. For offshore or other installations, no collecting reservoir may be required. The aqueous solution may also be obtained from a continuous expendable supply. The electrode, porous medium and membrane jacket cover, with or without the collecting reservoir, is provided in a preassembled reusable package. The assembly may readily be transported and mounted to or dismounted from the concrete structure.

32 Claims, 2 Drawing Sheets

METHOD AND APPARATUS FOR THE REMOVAL OF CHLORIDES FROM STEEL REINFORCED CONCRETE STRUCTURES

This invention relates generally as indicated to a method and apparatus for the removal of chlorides from steel reinforced concrete structures, and more particularly to an efficient and cost effective method and apparatus utilizing a uniformly saturated pore structure between the steel reinforcing bar and an electrode.

BACKGROUND OF THE INVENTION

Chlorides and chloride intrusion have long been known to be detrimental to steel reinforced concrete structures, causing the area around the steel bars to have a reduced pH and the bars to corrode. Corrosion of the bars causes spalling of the concrete leading to failure if costly repairs are not undertaken.

The present invention relates to certain improvements in the electrochemical removal of chlorides from concrete steel reinforced structures. Prior U.S. Pat. No. 4,832,803 discloses a method for removal of such chlorides using an electrode mounted on the structure with a set retarded spray-on material such as retarded gunnite. After the treatment process the gunnite is removed by washing with a stream of water and the electrode is removed. Prior art has also used blown on papiermache.

The work shown in such prior patent is an attempt to find field utility for chloride removal such as the experiments reported by Slater as mentioned in the text of such U.S. patent and the cited prior art therein. A similar process is shown in prior U.S. Pat. No. 4,865,702 which discloses a variety of electrolytic mediums, including salt solutions. Again however the medium is applied at the beginning of the treatment and removed at the end of the treatment. No effort is made to maintain a saturated pore structure uniformly throughout the treatment process.

Many problems have been encountered in attempting to apply such treatment processes on a full field scale. For example, it has been found that to initiate the treatment, the coating over the electrode has to be hosed down. If it dries out, it has to be hosed down again. Thus, the process may have to be constantly watched or supervised. It has also been found that excessive voltages are required for the treatment to be effective, and that the treatment takes an inordinate amount of time. Moreover, with prior art processes there is no way to add or control chemicals such as cation or anion inhibitors, nor is there any efficient means to calculate the amount of chloride removed. Furthermore, a custom application for each treatment and lack of reusability significantly increases the cost of the treatment.

It has been discovered that such treatments can be cost effective if there is a uniform saturated pore structure between the electrode and steel bar throughout the treatment process, and if the apparatus is prepackaged or partly assembled for easy field assembly and disassembly, and reusable.

SUMMARY OF THE INVENTION

A method and apparatus for the removal or reduction of chlorides from steel reinforced concrete utilizes an electrode with a rectifier impressing an electrical voltage between the steel of the concrete and the electrode. The electrode and the surrounding concrete are saturated continuously with a controlled flow aqueous electrolyte. The aqueous electrolyte increases chloride movement within the concrete away from the steel reinforcing and improves the efficiency of the process by maintaining a saturated pore structure within the concrete. To facilitate such saturation of the concrete and electrode, the electrode may be immersed in a matrix of a porous water absorbing medium contained within a non-metallic membrane or jacket cover. In some forms, a collecting bin or reservoir is provided at the bottom to collect the aqueous solution for recirculation. For offshore or other installations, no collecting reservoir is required. The aqueous solution may be water or salt water and be recirculated, or obtained from an expendable supply. The electrode, porous medium and membrane jacket cover, with or without the collecting reservoir is provided in a preassembled reusable package. The assembly may readily be transported and mounted to or dismounted from the concrete structure.

With the increased chloride movement and chloride removal, the proper pH at the steel is restored more quickly reducing the total necessary treatment time. The more efficient treatment process also maintains an efficient current level during treatment within reasonable voltage limits. Excess voltage levels are not required. Also overall power consumption for the treatment process is reduced. Efficiencies are also obtained from the ease of assembly of the apparatus, the mounting and dismounting of the apparatus, and reuse capabilities, all contributing the reduced cost of the treatment.

In addition the controlled flow aqueous electrolyte system provides a convenient method of controlling the chemical concentration of the solution to prevent or reduce acid or any poisonous attack to the concrete or to the assembly materials. It also provides a means of adding cation or anion inhibitors or which can then be transported in the aqueous solution for the protection of the reinforcing steel and/or the concrete. The flow also provides a means of adding chemicals to improve the treatment process and/or treatment efficiency. The controlled flow system facilitates the measurement and calculation of the amount of chloride removed.

While the present invention can readily be applied to vertical or angled piers or columns, arches, or even walls, it can also be applied to horizontal decks, slabs or floors, and even permit open vehicular or pedestrian traffic during treatment. It is thus possible to combine the traffic surface and the electrode element into a single assembly placed on the deck, slab or walkway surface. The porous medium which is subject to the continuous flow of aqueous solution may also become the traffic surface and can be wood, sand, asphalt, stone, concrete, or mortar and the like. For such mediums as asphalt, concrete or mortar, it would be like driving on moist pavement. It will also be appreciated that the electrode properly formed and secured to the deck can be subjected to the continuous flow aqueous solution by flooding or spraying the deck since most decks slope for drainage. In this manner, a driving surface over the treatment area without the porous medium and a jacket cover may be used.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
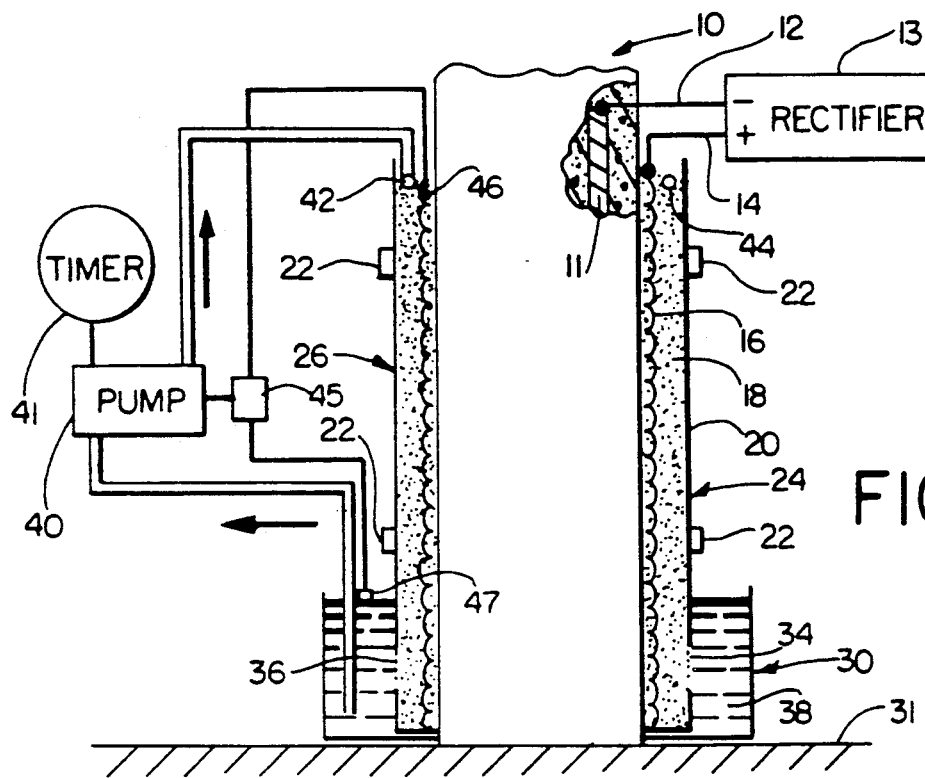
FIG. 1 is an illustration of the present invention applied to a column and recirculating the aqueous electrolyte from a collecting tank or reservoir.

In FIG. 1, there is illustrated a vertically extending steel reinforced concrete structure 10 such as a pier or column. The reinforcing steel indicated at 11 may be in the form of a cage or otherwise and is electrically connected at 12 to rectifier 13 which is in turn electrically connected at 14 to electrode 16. The electrode surrounds the column or pier and may comprise a mesh, net or grid of conductive steel, zinc or carbon, for example. The material of the electrode should be as inert as possible to enable reuse for a number of treatments. Through the employment of the rectifier, a voltage is established between the reinforcing steel and the electrode which will cause chloride ions to migrate away from the steel of the concrete structure and to the electrode 16 raising the pH of the concrete around the steel bar.

In FIG. 1, the electrode is positioned as close as possible to the exterior of the column or pier but is nonetheless surrounded by a porous medium indicated at 18 with both the electrode and the porous medium being contained in a non-metallic less porous jacket 20.

The electrode, the porous medium, and the outer jacket are preferably unitized into a preassembled structure which can readily be fastened around the column or pier. The porous medium can, for example, be sponge, cloth, plastic or rubber open cell foam, floss, cardboard, paper, fiber, wood, stone, sand, clay, asphalt, concrete, mortar, and the like. In column or pier applications, the lighter weight materials are preferred for ease of installation and removal. The criteria is that the medium be porous and have an ability to absorb and maintain the electrolyte throughout.

If the porous medium is particulate such as sand, a binder may be employed to form a matrix surrounding the electrode and unitizing the electrode, the porous medium and the non-metallic outer jacket 20.

The outer jacket is a non-metallic membrane which is either non-porous or has low porosity and can be formed of plastic sheets, SONOTUBE, which is a form of fiber or cardboard, fiberglass forms, inflatable forms, or any dense low porosity non-metallic membrane material. SONOTUBE is a trademark of Sonoco Products Co. of Hartsville, S.C.

In the embodiment illustrated in FIG. 1, if the column is round the electrode, porous medium, and outer jacket may be formed in two half-round structures hinged along a vertical edge and then clamped to the column or pier by clamps or bands indicated generally at 22. In this manner, the structures illustrated on opposite sides of the column or pier at 24 and 26 are actually two unitized structures held together by the fasteners indicated. The attaching assemblies 22 may take a variety of forms such as self-adhering straps, mechanical connectors, restraining devices, fasteners, locking devices which may be tightened, or inflatable or expandable tubes or covers which may be employed to press the two unitized structures tightly against the column or pier.

The lower end of the unitized structures 24 and 26 fit within a gutter or reservoir shown generally at 30 which surrounds the column or pier and which may rest on grade 31, or be supported thereabove. The jackets 20 of the sections 24 and 26 at their lower ends may be provided with screened ports seen at 34 and 36 through which the electrolyte flows or drains into the gutter or reservoir sump 30. The reservoir 30 may be provided with a cover, not shown, to minimize evaporation. Also, the gutter or sump may simply drain the electrolyte into a reservoir as a separate structure. In any event, the aqueous electrolyte shown at 38 is recirculated to the top of the electrode 16 by the pump 40 which may be operated intermittently by the timer 41. The output of the pump indicated at 42 may discharge directly into the top of the electrode assemblies 24 and 26 or the discharge may be distributed by an annular soaker hose indicated at 44. The pump may also be operated by relay or controller 45 which may be controlled by sensor 46 and/or float switch 47, the latter being positioned in the sump 30. The sensor 46 may be positioned anywhere in the system and may be a moisture, chemical, or electrical sensor.

As the aqueous electrolyte saturates the porous medium 18, it will also saturate the exterior of the column or pier and saturate the concrete between the electrode and the steel bar. Excess aqueous electrolyte flows back into the sump and is then recirculated to the top of the electrode. In this manner, the saturated pore structure within the concrete and surrounding the electrode increases the chloride movement within the concrete and, hence, increases the chloride removal efficiency. In the embodiment of FIG. 1, the aqueous electrolyte is recyclable from a sump basin or trough, and the saturated pore structure is maintained automatically and uniformly throughout the treatment process.

Figure 2:
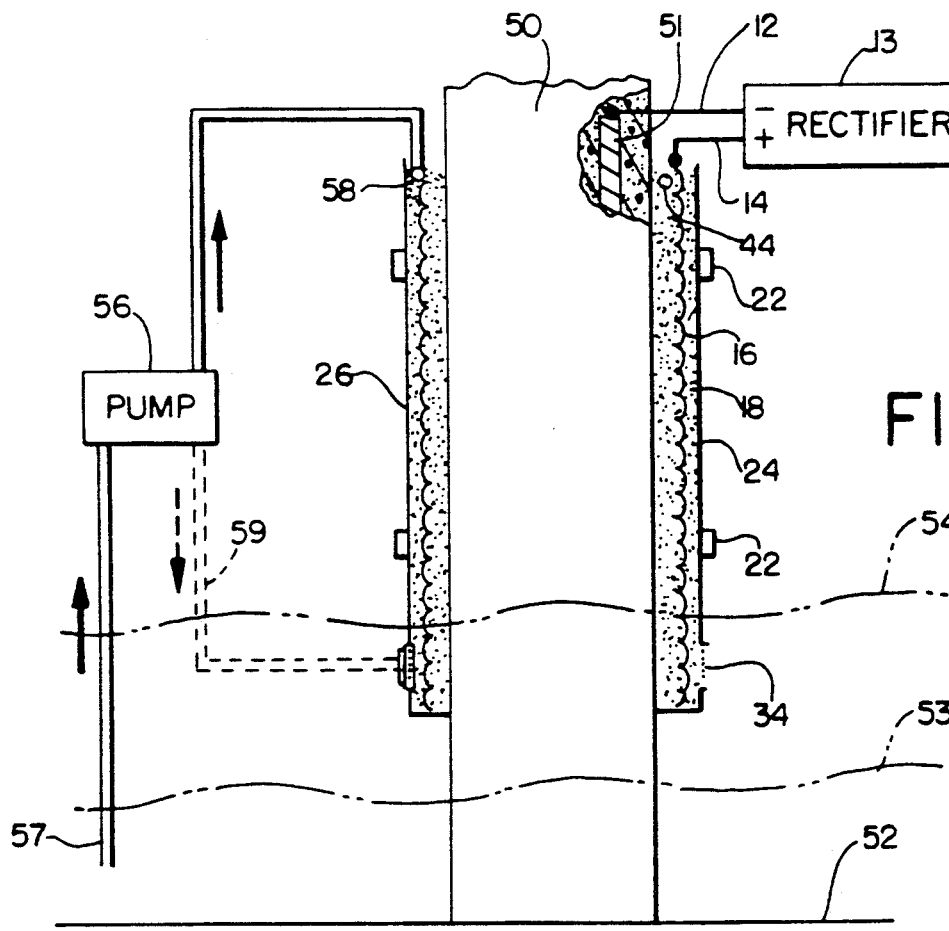
FIG. 2 is an illustration of the invention applied to an off shore or in water pier.

Referring now to FIG. 2 there is illustrated a column or pier 50 having steel reinforcement 51. The column or pier is supported in a sea or lake bed 52, and if a sea bed, the dotted lines 53 and 54 may illusrate the low and high tides, respectively. The same sections 24 and 26 are clamped or fastened to the pier or column 50, and the rectifier 13 establishes the potential between the electrode 16 and the steel reinforcing bar 51. However, instead of providing a sump or reservoir, the pump indicated at 56 takes its supply of aqueous electrolyte directly from the lake or sea as indicated at 57 and pumps that supply to the top of the unitary electrode assemblies 24 and 26 as indicated at 58. Again, the pump may be controlled by a timer, switches or sensors, or operate continuously. Any excess will simply flow back into the lake or sea. Also, as seen in FIG. 2, the outlet of the pump may be connected to the bottom of the sections as seen by the phantom line connection 59. In this manner, the aqueous electrolyte would flood upwardly through the sections and excess would flow out the top to drop back into the lake or sea bed. In FIG. 1, with a bottom pump output connection, the excess would drop from the top back into the sump 30.

In any event, the system maintains the saturated pore structure within the concrete and continuously from the steel reinforcing bar to the electrode. In the embodiment of FIG. 2, it can be seen that a constant new solution is supplied and that the aqueous solution is supplied from an essentially non-expendable source. A similar non-expendable source in most instances would be a city water supply. Again, the pump may be controlled by a timer, switches or sensors, or operate continuously. Chemicals may be added to the aqueous electrolyte supply either at the intake or discharge of the pump or at the soaker hose outlet 44.

If the vertical length of the treatment area is extensive, a number of unitized sections 24, 26 may be employed along the height of the column or pier. The lower end of the sections may extend inside the top of the next lower section in a shingle effect to maintain the electrolyte flow close to the concrete structure.

Figure 3:
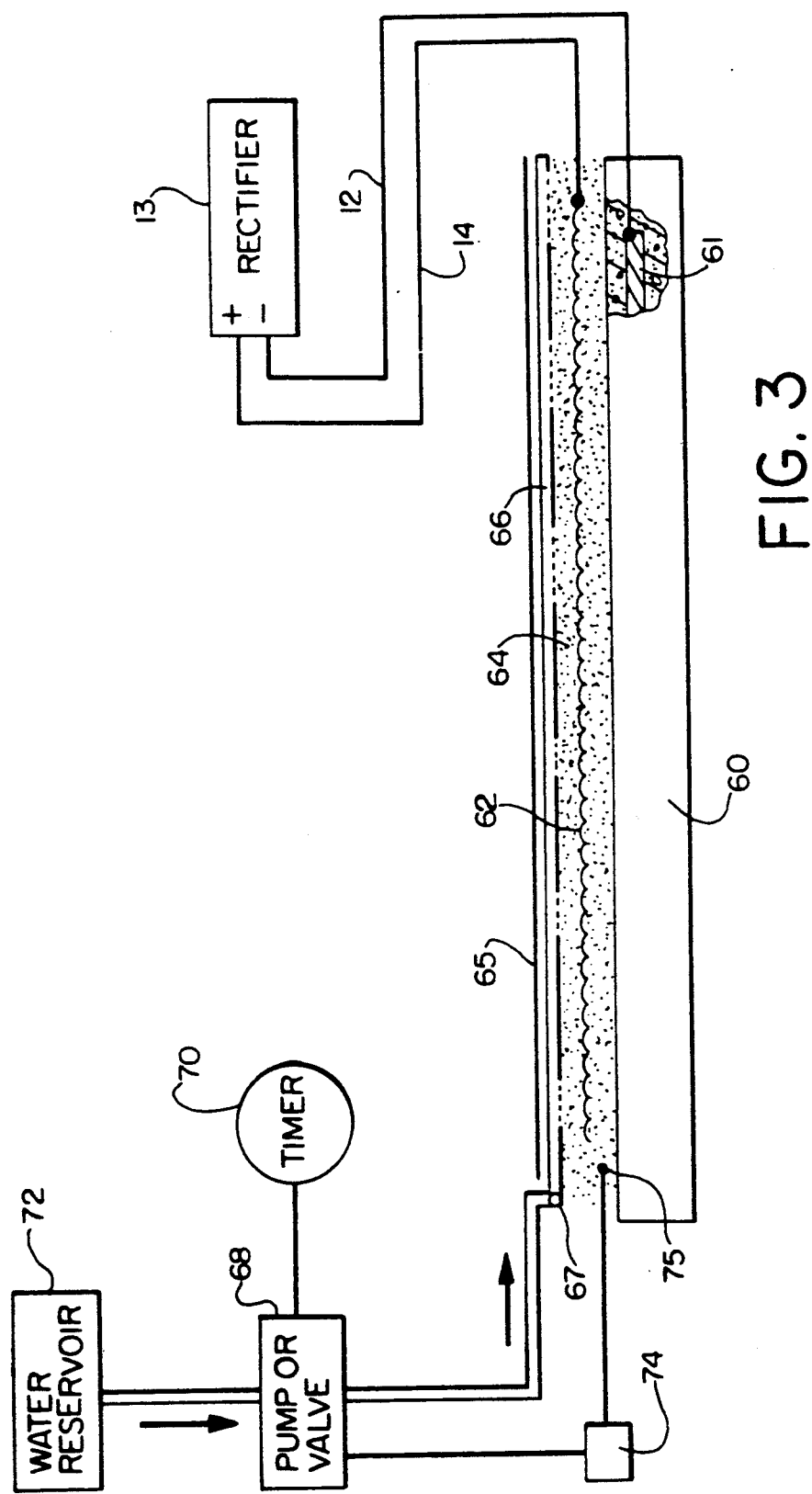
FIG. 3 is an illustration of the invention applied to the top side of a deck or slab.

In FIG. 3, there is illustrated a steel reinforced horizontal concrete deck 60, the steel being shown at 61. Again, the rectifier 13 is employed to establish a potential between the steel 61 and the electrode 62 through the connections 12 and 14, respectively. The electrode is embedded in the porous medium 64, and both the electrode and the porous medium may be of the same type and materials as disclosed above. A jacket membrane or cover is provided over the top of the porous medium as seen at 65.

Embedded within the porous medium are a series of soaker hoses 66 connected to manifold 67 which is in turn connected to pump or valve 68 controlled by timer 70. The pump or valve 68 is supplied from a water reservoir or tank 72, which may be positioned close to the area of the deck being treated. The electrolyte supply 72, thus, is an expendable supply, and the supply should contain sufficient electrolyte to maintain the saturated pore structure of both the porous medium 64 and the concrete 60 throughout the course of the treatment. Again, as illustrated, the pump or valve 68 may be operated by controller 74 in turn actuated by sensor 75 positioned at selected locations anywhere in the system, to sense moisture, chemical content or electrical characteristics.

If the top deck is to be open during the course of the treatment to permit traffic, the top membrane or jacket 65 may be the driving surface. The elements 62, 64, 65 and 66 each or in combination may be a unitary assembly simply placed on top of the deck section 60 to be treated and vehicles may drive over the top. The porous medium in the horizontal deck application may, for example, be wood, sand, asphalt, stone, concrete, mortar, etc., and the like.

In some cases, the unitizing jacket may be omitted. If porous mediums such as asphalt, concrete or mortar are employed, the aqueous electrolyte may be soaked directly into such medium. As the aqueous solution is pumped or drained into the porous medium and soaked into the concrete deck, the effect would be like driving on wet or moist pavement. In the case of wood, it would be like driving on a wooden bridge. In the case of sand or stone, it would be similar to driving on a wet gravel highway.

It should be noted that the treatment of the present invention can be performed without any porous medium or jacket if the electrode can be kept close enough to the concrete surface and be kept wet throughout the course of the treatment. It will be understood that the porous medium is simply a vehicle to ensure that the entire electrode is maintained wet and contiguous with the wet concrete during the treatment process.

Although it may sound incongruous to utilize sea water as the aqueous solution, the purpose of the aqueous electrolyte is to flush chlorides from all surfaces of a concrete and causing it not to become stagnant. Thus, even sea water will accomplish this purpose. The wetness in the porous medium and in the surrounding concrete makes the entire removal process much more efficient.

It can now be seen that the present invention may employ a recyclable or constant new solution. If recyclable, sumps, basins or troughs are employed. In connection with the constant new solution, either fresh or sea water may be employed, or bodies of water from tanks or reservoirs, or water from municipal systems.

The treatment increases the chloride movement within the concrete and hence, chloride removal efficiency by maintaining a saturated pore structure within the concrete. This not only reduces the treatment time for the chloride removal but also maintains efficient current level during the treatment within low voltage limits. The system also provides a convenient means to control chemical concentration of the solution to prevent or reduce acid or any poisonous attack to the concrete or to assembly materials. It also provides a means of adding chemicals to improve the treatment process or the treatment efficiency, and a means of adding cation or anion inhibitors or formulas which can be transported in an aqueous solution for protection of the reinforced concrete structure steel or concrete.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

What is claimed is:

1. A method of treating steel reinforced concrete structures to remove chlorides therefrom comprising the steps of
   placing an electrode adjacent an outer surface of the reinforced concrete structure,
   continuously wetting said electrode and the outer surface of said reinforced concrete structure with an aqueous electrolyte during the treatment process, and
   applying a direct current between said steel reinforcing and said electrode to cause chloride ions within said reinforced concrete structure to migrate to the electrode.

2. A method as set forth in claim 1 including the step of automatically supplying an aqueous solution to the electrode during the treatment process to maintain such wetting.

3. A method as set forth in claim 2 wherein said aqueous solution is recirculated.

4. A method as set forth in claim 2 wherein said aqueous solution is obtained from an expendable source.

5. A method as set forth in claim 2 wherein said electrode is surrounded by a porous medium also continuously wetted during the process.

6. A method as set forth in claim 5 wherein said electrode and porous medium are contained by a non-metal jacket of low porosity.

7. A method as set forth in claim 5 wherein said electrode and porous medium form a preassembled unit for mounting and dismounting from a reinforced concrete structure, and for reuse.

8. A method as set forth in claim 5 wherein said concrete structure is a horizontal deck and said porous medium and electrode are above said deck, and said porous medium constituting a traffic surface.

9. A method as set forth in claim 2 wherein said electrode is contained by a non-metal jacket of low porosity, and said electrode and jacket form a preassembled unit.

10. A method as set forth in claim 2 wherein said aqueous solution is intermittently supplied at selected intervals by means of a timer, or controlled by a sensor or switch.

11. A method as set forth in claim 10 wherein said timer or controller operates a pump or valve.

12. A method as set forth in claim 2 wherein said concrete structure is a horizontal deck, said electrode constituting a traffic surface.

13. A method as set forth in claim 2 wherein said concrete structure is a horizontal deck, a jacket over said electrode, said jacket constituting a traffic surface.

14. A method as set forth in claim 2 wherein said concrete structure is vertical such as a column, pier or wall, and said solution is circulated from the bottom of the electrode to the top or vice versa.

15. A method as set forth in claim 14 including the step of providing a sump at the bottom of the electrode to facilitate recirculation.

16. Apparatus for treatment of a steel reinforced concrete structure comprising an electrode, means operative to mount said electrode on an exterior surface of said concrete structure, means to control wetting of said electrode and said structure with an aqueous electrolyte and means electrically to connect said electrode and said steel to apply a direct current between said steel reinforcing and said electrode to cause chloride ions within said concrete structure to migrate to the electrode and away from the steel reinforcing.

17. Apparatus as set forth in claim 16 including means automatically to supply an aqueous solution to the electrode during treatment.

18. Apparatus as set forth in claim 17 including means to recirculate the aqueous solution.

19. Apparatus as set forth in claim 17 including timer, sensor, or switch means to control the supply of the aqueous solution, and also to facilitate chemical treatment of said aqueous solution.

20. Apparatus as set forth in claim 19 wherein said control means operates a pump or valve controlling the flow of the aqueous solution to the electrode.

21. Apparatus as set forth in claim 17 wherein said electrode is contained by a non-metal jacket of low porosity, and said electrode and jacket form a preassembled unit.

22. Apparatus as set forth in claim 17 wherein said concrete structure is a horizontal deck, said electrode constituting a traffic surface.

23. Apparatus as set forth in claim 17 wherein said concrete structure is a horizontal deck, a jacket over said electrode, said jacket constituting a traffic surface.

24. Apparatus as set forth in claim 17 wherein said concrete structure is vertical such as a column, pier or wall, and said solution is circulated from the bottom of the electrode to the top or vice versa.

25. Apparatus as set forth in claim 24 including sump means at the bottom of the electrode to facilitate recirculation.

26. Apparatus as set forth in claim 16 wherein said aqueous electrolyte is water.

27. Apparatus as set forth in claim 26 wherein said water is sea water.

28. Apparatus as set forth in claim 16 wherein said aqueous electrolyte is obtained from an expendable supply.

29. Apparatus as set forth in claim 16 wherein said electrode is surrounded by a porous water absorbing medium which is also continuously wetted during the treatment.

30. Apparatus as set forth in claim 29 wherein said porous medium and electrode are contained by a non-metal jacket of low porosity.

31. Apparatus as set forth in claim 30 wherein said electrode, porous medium and jacket form a preassembled unit for mounting and dismounting on a concrete structure, and for reuse.

32. Apparatus as set forth in claim 29 wherein said concrete structure is a horizontal deck and said porous medium and electrode are above said deck, said porous medium constituting a traffic surface.

* * * * *